(12) United States Patent
Park

(10) Patent No.: US 6,246,448 B1
(45) Date of Patent: Jun. 12, 2001

(54) PURITY ADJUSTMENT DEVICE FOR VIDEO DISPLAY APPLIANCE

(75) Inventor: Kwang Ho Park, Kyoungsangbuk-Do (KR)

(73) Assignee: L.G. Electronics, Inc., Seoul (KR)

( * ) Notice: Subject to any disclaimer, the term of this patent is extended or adjusted under 35 U.S.C. 154(b) by 0 days.

(21) Appl. No.: 08/929,440

(22) Filed: Sep. 12, 1997

(30) Foreign Application Priority Data

Sep. 13, 1996 (KR) .................................................. 96-39686

(51) Int. Cl.⁷ ..................................................... H04N 5/65
(52) U.S. Cl. ................. 348/820; 315/370; 315/8
(58) Field of Search .................... 348/820, 808, 348/806, 807; 315/8, 370, 85

(56) References Cited

U.S. PATENT DOCUMENTS

| | | | |
|---|---|---|---|
| 4,950,955 | * | 8/1990 | Hoover et al. ............................ 315/8 |
| 5,604,403 | * | 2/1997 | Levy et al. ............................... 315/8 |

FOREIGN PATENT DOCUMENTS

| | | |
|---|---|---|
| 91201364 | 4/1991 | (EP) . |
| 95201774 | 4/1991 | (EP) . |
| 02227392 | 8/1990 | (JP) . |

* cited by examiner

*Primary Examiner*—Michael Lee
(74) *Attorney, Agent, or Firm*—Oppenheimer Wolff & Donnelly

(57) ABSTRACT

A purity adjustment device for a video display appliance which automatically compensates for a purity of a picture displayed on a CRT screen that is varied due to the change of the earth magnetic field by electromagnetic deflection using a purity coil. The picture adjustment device includes an initial value determining section for determining a first voltage corresponding to an earth magnetic field of a specified place where a purity of a picture displayed on the CRT presents white, an earth magnetic field detecting coil for detecting the earth magnetic field of a present place where the video display appliance is located, and producing a second voltage corresponding to the detected earth magnetic field, a comparison-amplifying section for comparison-amplifying a third voltage, in which the first and second voltages are superimposed together, with reference to an input reference voltage, an amplifying section for amplifying an output of the comparison-amplifying section to produce a purity compensation voltage, and a purity coil for producing a magnetic field for controlling a position of electron beams scanned on a screen of the CRT in accordance with the purity compensation voltage.

4 Claims, 2 Drawing Sheets

PURITY ADJUSTMENT DEVICE FOR VIDEO DISPLAY APPLIANCE

BACKGROUND OF THE INVENTION

1. Field of the Invention

The present invention relates generally to a purity adjustment device for a video display appliance such as a television receiver or a color monitor. In particular, the present invention relates to a purity adjustment device for a video display appliance which can automatically compensate for the purity of the picture that is varied due to the influence of the earth magnetism by electromagnetic deflection using a purity coil.

2. Description of the Related Art

Generally, in order to clearly display RGB (red, green, blue) color signals on a CRT (cathode ray tube) screen of a video display appliance, a purity adjustment is essentially required. Such a purity adjustment is performed in such a manner that the RGB color signals are scanned on one point of the screen, i.e., on a pixel of the screen and then the purity is adjusted until the color of the point becomes white.

A conventional purity adjustment device for a video display appliance, as shown in FIG. 1, includes a CRT 71 having electron guns 70 for emitting electron beams for the RGB color signals and displaying a color image on its screen, a centering permanent magnet 72, mounted on the neck portion of the CRT 71, for positioning the electron beam spot on the center of the fluorescent screen of the CRT 71 by its electromagnetic force, and a deflection coil 73, mounted on the neck portion of the CRT 71, for deflecting the electron beams emitted from the electron guns 70 in horizontal and vertical directions.

The operation of the conventional purity adjustment device as constructed above will be explained.

First, when an experimental image signal is inputted to the CRT 71 for the purity adjustment of the CRT 71, electron beams for the RGB color signals corresponding to the input video signal are emitted from the electron guns 70 to the fluorescent screen of the CRT 71. At the same time, the electron beams emitted from the electron guns 70 pass through the region of the centering magnet 72, and thus the spot of the electron beams is positioned on the center of the fluorescent screen by the magnetic field produced from the centering magnet 72. Also, the spot of the electron beams is deflected in the vertical and horizontal directions by the deflection coil 73 to scan the fluorescent screen of the CRT 71, resulting in that the fluorescent screen of the CRT 71 produces a color which corresponds to the electron beams for the RGB color signals being scanned on the fluorescent screen. At this time, an examiner may observe the color displayed on the screen of the CRT 71, and adjust the purity by adjusting the position of the deflection coil 73 and the centering magnet 72 so that the color displayed on the screen presents white.

However, according to the conventional purity adjustment device as described above, since the purity is adjusted so that the electron beam spot is positioned on the center of fluorescent screen of the CRT 71 by the centering magnet 72 mounted on the neck portion of the CRT 71, the purity should be newly adjusted if the direction of the earth magnetic field is changed. Specifically, if the use environment of the video display appliance is changed, for instance, if the video display appliance whose purity adjustment has been made in the Southern Hemisphere is to be used in the Northern Hemisphere, the position of the electron beam spot scanned on the CRT screen will be changed due to the change of the earth magnetic field, whose direction in the Southern Hemisphere is opposite to that in the Northern Hemisphere, thereby deteriorating the purity of the picture displayed on the CRT screen.

SUMMARY OF THE INVENTION

It is an object of the present invention to solve the problems involved in the related art, and to provide a purity adjustment device for a video display appliance which can keep the purity of the picture displayed on the CRT screen uniform regardless of the change of the use environment of the video display appliance by automatically compensating for the purity that is varied due to the influence of the earth magnetic field by electromagnetic deflection using a purity coil.

In order to achieve the above object, there is provided a purity adjustment device for a video display appliance having a cathode ray tube (CRT), comprising:

- an initial value determining section for determining a first voltage corresponding to an earth magnetic field of a specified place where a purity of a picture displayed on the CRT presents white;
- an earth magnetic field detecting section for detecting the earth magnetic field of a present place where the video display appliance is located and producing a second voltage corresponding to a detected earth magnetic field;
- a comparison-amplifying section for comparison-amplifying a third voltage, in which the first voltage from the initial value determining section and the second voltage from the earth magnetic field detecting section are superimposed together, with reference to an input reference voltage;
- an amplifying section for amplifying an output of the comparison-amplifying section and producing a purity compensation voltage; and
- a purity coil for producing a magnetic field for controlling a position of electron beams scanned on a screen of the CRT in accordance with the purity compensation voltage provided from the amplifying section.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 1:
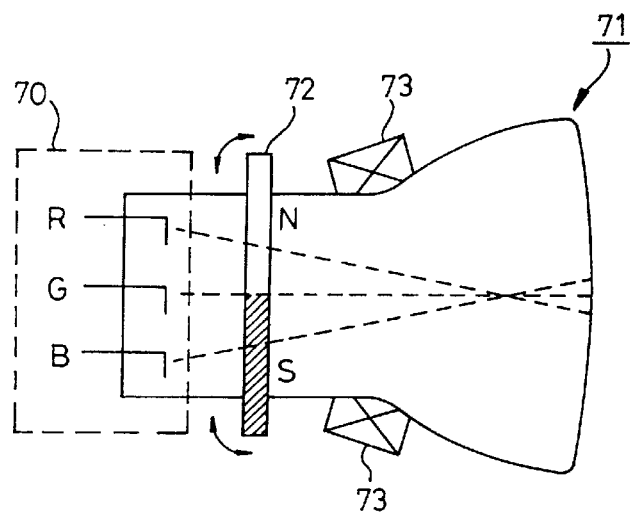
FIG. 1 is a view illustrating the structure of a conventional purity adjustment device for a video display appliance.
Figure 2:
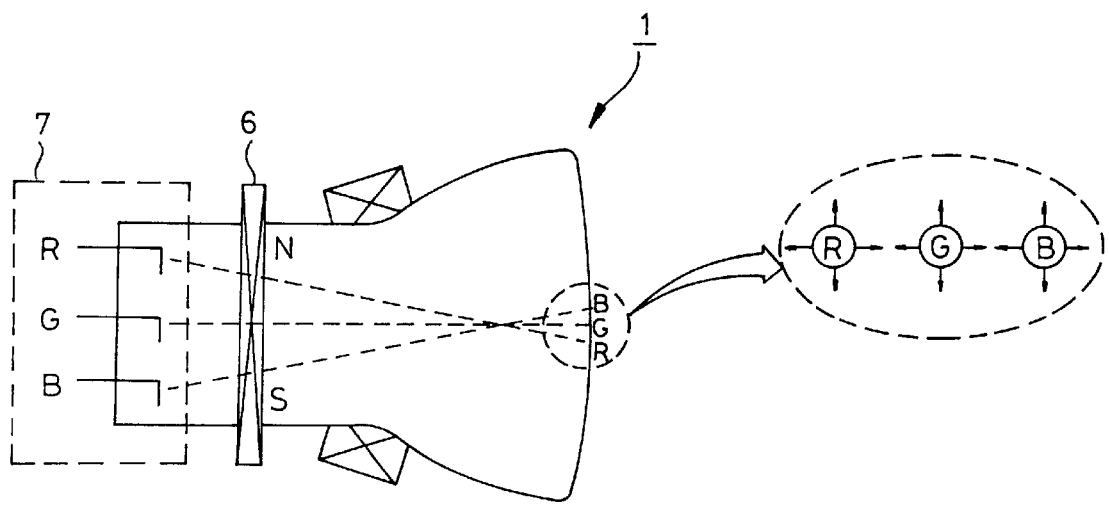
FIG. 2 is a view illustrating the structure of the purity adjustment device for a video display appliance according to the present invention.
Figure 3:
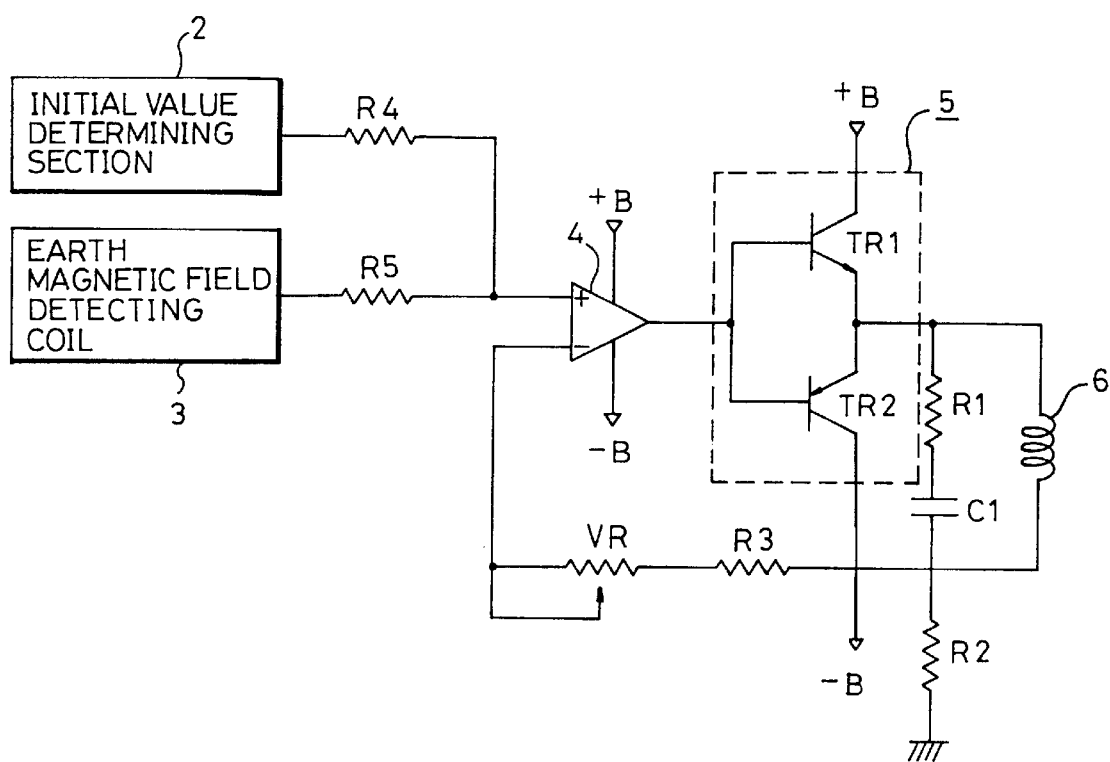
FIG. 3 is a schematic circuit diagram of the purity adjustment device according to the present invention.

FIGS. 2 and 3 show the structure and the circuit construction of the purity adjustment device according to the present invention.

Referring to FIGS. 2 and 3, the purity adjustment device for a video display appliance according to the present invention includes an initial value determining section 2 for determining a first voltage corresponding to an earth magnetic field of a specified place where a purity of a picture displayed on a CRT 1 presents white, an earth magnetic field detecting coil 3 for detecting the earth magnetic field of a present place where the video display appliance is located and producing a second voltage corresponding to a detected earth magnetic field, a comparison-amplifying section 4 for comparison-amplifying a third voltage, in which the first voltage from the initial value determining section 2 and the second voltage from the earth magnetic field detecting coil 3 are superimposed together, with reference to an input reference voltage, a push-pull amplifying section 5 for amplifying an output of the comparison-amplifying section 4 and producing a purity compensation voltage, and a purity coil 6 for producing a magnetic field for controlling a position of electron beams scanned on a screen of the CRT 1 in accordance with the purity compensation voltage provided from the push-pull amplifying section 5.

The push-pull amplifying section 5 comprises an NPN-type transistor TR1 and a PNP-type transistor TR2 which are connected together in a complementary and symmetric manner. Each base of the transistors TR1 and TR2 is connected in common with the output terminal of the comparison-amplifying section 4, and each emitter thereof is connected in common with the purity coil 6. Also, the purity coil 6 is connected in parallel with a resistor R1 and a capacitor C1, and the contact point of the purity coil 6 and the capacitor C1 is coupled to ground through a resistor R2.

In the embodiment, the comparison-amplifying section 4 comprises an operational amplifier. To the inverting (−) terminal of the operational amplifier 4 is connected a variable resistor VR and a resistor R for providing the reference voltage to the operational amplifier 4. The contact point of the output terminals of the initial value determining section 2 and the earth magnetic field detecting coil 3 is coupled to the non-inverting (+) terminal of the operational amplifier 4 through resistors R4 and R5.

In the drawing, the reference numerals +B and −B denote a DC supply voltage.

The operation of the purity adjustment device according to the present invention as constructed above will be explained in detail with reference to FIGS. 2 and 3.

Referring to FIG. 3, when the electron beams for the RGB color signals are emitted from the electron guns 7 to the fluorescent screen of the CRT 1, the fluorescent screen produces a color corresponding to the electron beams for the RGB color signals. At this time, the first voltage, which corresponds to the earth magnetic field of a specified place where the purity of the picture displayed on the screen of the CRT 1 presents white, is outputted from the initial value determining section 2 to the non-inverting (+) terminal of the operational amplifier 4 through the resistor R4. For instance, the initial value determining section 2 outputs a voltage of OV if the specified place is the equator. At the same time, the second voltage, which corresponds to the earth magnetic field of the present place where the video display appliance is located, is outputted from the earth magnetic field detecting coil 3 to the non-inverting (+) terminal of the operational amplifier 4 through the resistor R5. As a result, the voltage inputted to the non-inverting (+) terminal of the operational amplifier 4 represents the voltage wherein the first voltage from the initial value determining section 2 and the second voltage from the earth magnetic field detecting coil 3 are superimposed together. Here, the second voltage outputted from the earth magnetic field detecting coil 3 varies in accordance with the earth magnetic field of the place where the video display appliance is located.

The operational amplifier 4 comparison-amplifies the superimposed voltage inputted to its non-inverting (+) terminal with reference to the reference voltage provided to its inverting (−) terminal through the variable resistor VR.

For instance, it can be presumed that the output of the initial value determining section 2 is set based on the equator, and the earth magnetic field in the Northern Hemisphere regions has a positive ("+") value. In this case, if the video display appliance is located in a Northern Hemisphere region, the superimposed voltage inputted to the non-inverting (+) terminal of the operational amplifier 4 becomes greater than the reference voltage inputted to the inverting (−) terminal thereof, and thus the operational amplifier 4 outputs a compensation voltage of a positive ("+") value. On the other hand, if the video display appliance is located in a Southern Hemisphere region, the superimposed voltage inputted to the non-inverting (+) terminal of the operational amplifier 4 becomes lower than the reference voltage inputted to the inverting (−) terminal thereof, and the operational amplifier 4 outputs a compensation voltage of a negative ("+") value. The output value of the earth magnetic field detecting coil 3 may also vary depending on the installation condition of the video display appliance even though the video display appliance is located in the same earth magnetic field region of the Northern or Southern Hemisphere.

If the compensation voltage outputted from the operational amplifier 4 has the positive ("+") value, it is applied to each base of the NPN-type and PNP-type transistors TR1 and TR2 in the push-pull amplifying section 5, causing the NPN-type transistor TR1 to be turned on, while the PNP-type transistor TR2 being turned off. Thus, the positive compensation voltage is amplified by the transistor TR1, and the amplified compensation current flows to ground through the purity coil 6 and the resistor R2. At this time, the purity coil 6 produces a magnetic field corresponding to the compensation current applied thereto, and this magnetic field affects the position of the electron beams to compensate for the purity of the picture displayed on the CRT screen.

Meanwhile, if the compensation voltage outputted from the operational amplifier 4 has the negative ("−") value, it is also applied to each base of the NPN-type transistors TR1 and TR2 in the push-pull amplifying section 5, causing the PNP-type transistor TR2 to be turned on, while the NPN-type transistor TR1 being turned off. Thus, the negative compensation voltage is amplified by the transistor TR2, and the amplified compensation current flows through the purity coil 6 and the emitter-collector path of the transistor TR2. At this time, the purity coil 6 produces a magnetic field corresponding to the compensation current applied thereto, and this magnetic field affects the position of the electron beams to compensate for the purity of the picture displayed on the CRT screen.

In the above purity compensation operation, the direction of the compensation current flowing through the transistor TR1 is opposite to that of the compensation current flowing through the transistor TR2, and thus the direction of the earth magnetic field produced from the purity coil 6 during the turn-on of the transistor TR1 is also opposite to that of the earth magnetic field produced from the purity coil 6 during the turn-on of the transistor TR2.

As a result, the earth magnetic field detecting coil 3 outputs a purity compensation voltage corresponding to the earth magnetic field which may be changed due to the installation condition of the video display appliance, and thus the purity coil 3 produces the magnetic field for positioning the electron beams scanned on the CRT screen in accordance with the compensation voltage, resulting in that the automatic purity adjustment is achieved.

From the foregoing, it will be apparent that the present invention provides the advantages that it can keep the purity of the picture displayed on the CRT screen uniform regardless of the change of the use environment of the video display appliance by automatically compensating for the purity that is varied due to the change of the earth magnetic field.

While the present invention has been described and illustrated herein with reference to the preferred embodiment thereof, it will be understood by those skilled in the art that various changes in form and details may be made therein without departing from the spirit and scope of the invention.

What is claimed is:

1. A purity adjustment device for a video display appliance having a cathode ray tube (CRT), comprising:

an initial value determining section for determining a first voltage corresponding to an earth magnetic field of a specified place where a purity of a picture displayed on the CRT present white;

an earth magnetic field detecting coil for detecting the earth magnetic field of a present place where the video display appliance is located, and producing a second voltage corresponding to the detected earth magnetic field;

a comparing section in which the first voltage from the initial value determining section and the second voltage from the earth magnetic field detecting coil are superimposed together, and compared to an input reference voltage to produce a third voltage that is amplified to produce an output;

an amplifying section for amplifying an output of the comparing section and producing an amplified voltage as a purity compensation voltage; and a purity coil for producing a magnetic field for controlling a position of electron beams scanned on a screen of the CRT in accordance with the purity compensation voltage provided from the amplifying section.

2. A purity adjustment device as claimed in claim 1, wherein the amplifying section comprises an NPN-type transistor and a PNP-type transistor which are connected together in a complementary and symmetric manner.

3. A purity adjustment device claimed in claim 1, further comprising a variable resistor for varying the purity compensation voltage flowing through the purity coil and providing the varied purity compensation voltage to the comparing section as the reference voltage.

4. A purity adjustment device as claimed in claim 1, wherein the comparing section ccomprises an operational amplifier.

* * * * *